United States Patent [19]
Dutta et al.

[11] Patent Number: 5,314,723
[45] Date of Patent: May 24, 1994

[54] METHOD OF COATING PHOSPHORS ON FLUORESCENT LAMP GLASS

[75] Inventors: Arunava Dutta, Chestnut Hill; Lenoard V. Dullea, Peabody, both of Mass.

[73] Assignee: GTE Products Corporation, Danvers, Mass.

[21] Appl. No.: 895,762

[22] Filed: Jun. 9, 1992

[51] Int. Cl.$^5$ .............................................. B05D 5/06
[52] U.S. Cl. ...................................... 427/476; 427/67; 427/71; 427/226; 427/236; 427/314; 427/427; 427/486; 427/562; 427/564
[58] Field of Search ............... 427/476, 486, 67, 562, 427/564, 427, 576, 226, 314, 460, 459, 71, 236

[56] References Cited

U.S. PATENT DOCUMENTS

| | | | |
|---|---|---|---|
| 3,483,010 | 12/1969 | Glovatsky et al. | 427/71 |
| 3,513,011 | 5/1970 | Miller | 427/71 |
| 3,672,927 | 6/1972 | Spiller et al. | 427/71 |
| 4,081,714 | 3/1978 | Mossel et al. | 313/493 |
| 4,128,674 | 12/1978 | Hedler | 427/71 |
| 4,175,143 | 11/1979 | Speigel | 427/71 |
| 4,597,984 | 7/1986 | Jansma | 427/28 |
| 4,610,217 | 9/1986 | Czeiler et al. | 118/47 |
| 4,689,172 | 8/1987 | Czeiler et al. | 252/301 |
| 4,806,389 | 2/1989 | Peters et al. | 427/71 |
| 4,914,723 | 4/1990 | Ellerbeck et al. | 313/493 |
| 5,032,420 | 7/1991 | Shobert et al. | 427/28 |
| 5,077,088 | 12/1991 | Jeong | 427/71 |

FOREIGN PATENT DOCUMENTS

| | | |
|---|---|---|
| 156497 | 9/1982 | Fed. Rep. of Germany . |
| 51-38357 | 3/1976 | Japan . |
| 51-39509 | 4/1976 | Japan . |

*Primary Examiner*—Janyce Bell
*Attorney, Agent, or Firm*—Robert E. Walter; Elizabeth A. Levy; Robert F. Clark

[57] ABSTRACT

In process for forming a coating of phosphor particles on a fluorescent lamp glass, a polymer is deposited on the phosphor particles and the phosphor particles are entrained in a carrier gas with the polymer in a non-adhering state, and then the phosphor particles are coated on the fluorescent lamp glass with the polymer in an adhering state for retaining the phosphor particles on the fluorescent glass and, the coated fluorescent glass is heated to a temperature above the decomposition temperature of the polymer for removing the polymer and to form a coating of phosphor particles on a fluorescent lamp glass.

34 Claims, 1 Drawing Sheet

METHOD OF COATING PHOSPHORS ON FLUORESCENT LAMP GLASS

FIELD OF THE INVENTION

This invention relates to fluorescent lamps and more particularly to a method for coating a fluorescent lamp glass.

BACKGROUND INFORMATION

Energy efficient compact fluorescent lamps are very much in demand today. Environmentally conscious people are turning to these lamps to cut down significantly on the usage of electricity without sacrificing lumens. The decrease in the consumption of electric power translates to an appreciable lowering in the emissions of acid rain precursors and green house gases from power plants.

Presently, most compact fluorescent lamps are made using water base coating technology which suffers from several drawbacks. An electrostatic coating method would eliminate suspension degradation due to the characteristic long term holdover in water base systems. Loss of phosphor due to redispersion problems with drying chamber belt scrapings would also be done away with. In addition, an electrostatic coating process would make shrinkage, due to lack of adequate insolubility of the first coat in conventional two coat lamp systems, a thing of the past. Also, problems due to progressive flocculation of Aluminum Oxide C in first coat suspensions would be solved. Furthermore, an electrostatic coating process would realize powder weight savings since it needs small particle size phosphor. Use of small particle size phosphors in water base coatings is difficult due to the high aqueous reactivity of such materials and the imperfections in protective coatings deposited on such powders. Another advantage of an electrostatic coating process lies in the elimination of the need for a dedicated brushing machine after bakeout, since electrostatically coated lamps can be brushed easily before bakeout by a unit mounted in the coating station. This yields savings in maintenance since there is one less machine, the brusher, to maintain. Finally, an electrostatic coating unit needs a smaller footprint than a comparable water base coating system.

U.S. Pat. No. 5,032,420 discusses a method of manufacturing Cd free yellow incandescent bug lights. The emphasis is on the powder which is used for the coating process: $ZrSiO_4/Pr$ mixed with 10% amorphous silica. There is no mention of the use of a polymer in this description. U.S. Pat. No. 4,914,723 discloses a standard fluorescent lamp discharge tube with an electrostatically coated envelope. The phosphor is pretreated prior to the electrostatic coating step, by coating the powder with a fatty acid (like palmitic, oleic etc.) or a $NH_4$, Al or alkaline earth salt and finely divided alumina. The relative composition of the mix is 100 parts by weight phosphor, 0.01 to 3 parts by weight fatty acid and 0.05 to 5 parts by weight fine particle size alumina. This work does not use any polymeric material in the phosphor pretreatment step.

U.S. Pat. No. 4,689,172 teaches a process for the surface treatment of phosphors prior to electrostatic coating of the material on low pressure mercury vapor discharge lamps. The treated material can preferably be used for coating the envelope of compact fluorescent lamps as well as standard size fluorescent lamps. In the course of suspension, the luminescent materials are treated with acids the anhydrides of which are susceptible to the formation of low melting point glasses. Aliphatic amines are subsequently adsorbed onto the acid treated particle surfaces. According to the inventors, the double acid-alkylamine layer makes the particles hydrophobic and more easily sprayable and dischargeable. In the course of heat treatment, the amine is removed without leaving any C contaminants. The glass forming oxide liberated during heat treatment adheres the particles together and to the glass. Examples of glass forming acids are boric and phosphoric acid while examples of amines are n-butyl and n-octyl. Polymers do not figure in the surface treatment taught in this patent.

U.S. Pat. No. 4,610,217 relates to an apparatus for the electrostatic coating of the insides of different kinds of bulbous lamp envelopes. Means of producing a homogeneous smoke of the powder are discussed. No special pretreatment of the phosphor is discussed. U.S. Pat. No. 4,597,984 presents a method and apparatus for coating fluorescent lamp tubes. In particular, this work focuses on the U lamp and the twin tube configuration lamp (GE Mod-U-Line). This invention teaches the use of dual electrodes: one is stationed outside the U tube and a pair are located inside the two legs. The electrodes move in sequence, the movement being controlled by a motor mechanism. The glass tube is maintained between 150° C. and 500° C. to render it conductive. After the deposition step, the phosphor coating is humidified by blowing saturated air over the layers resulting in a decrease in voidage and a more compact coating. Humidification is followed by a low temperature bakeout, 475° to 600° C., which removes any moisture from the coating and bonds the phosphor particles to the glass and to themselves. As set forth in column 6, lines 31 to 36, "A lower lehring temperature may be employed following the electrostatic deposition according to the present invention than is employed in prior art slurry deposition, because no organic binder containing carbon materials is used to initially bond the phosphor coating to the glass".

U.S. Pat. No. 4,081,714 teaches pretreatment of phosphors for electrostatic coating of standard size fluorescent lamps. In particular, 100 parts by weight phosphor are mixed with 0.01 to 1 part by weight stearic, palmitic acid or salts thereof, 0.1 to 3 parts by weight Ca or Sr nitrate for good adhesion and 0.05 to 5 parts by weight fine alumina for flowability. Polymers are not used in this invention. JP 7639509 and JP 7638357 discuss electrostatic coating of standard fluorescent lamps wherein phosphor powder is mixed with 0.1 to 8 weight % calcium pyrophosphate or low melting point glass frit and charged at 18–22 kV. DD 156,497 teaches the coating of phosphor powders onto lamp envelope walls by mixing phosphor with diammonium hydrogen phosphate, coating the mixture electrostatically and heating. Neither the Japanese nor the East German patents discuss the use of a polymeric material for the surface treatment of the phosphor.

BRIEF SUMMARY OF THE INVENTION

In accordance with the present invention, there is provided a method for forming a coating of phosphor particles on a fluorescent lamp glass comprising depositing a polymer on the phosphor particles to form phosphor particles comprising polymer wherein the polymer is a type having a decomposition temperature and which is transformable from a non-adhering state to an adhering state, entraining phosphor particles comprising polymer in a carrier gas wherein the polymer is in a non-adhering state, depositing the phosphor particles comprising polymer on the fluorescent lamp glass wherein the polymer is in an adhering state for retaining the phosphor particles on the fluorescent glass and form a coated fluorescent glass, heating the coated fluorescent glass to a temperature above the decomposition temperature of the polymer for removing the polymer and form a coating of phosphor particles on a fluorescent lamp glass.

According to a preferred embodiment, the phosphor particles are deposited on the fluorescent glass by applying a sufficient electric charge to the phosphor particles comprising polymer for attracting these particles to the fluorescent lamp glass.

According to another preferred embodiment, the polymer on the phosphor particles is a type which becomes tacky when heated, and according to the method, phosphor particles are entrained in the carrier gas in a non-tacky state and deposited on the fluorescent lamp glass by heating to the tacky state to retain the phosphor particles on the fluorescent glass and form a coated fluorescent glass. Subsequently, the fluorescent glass is heated to a temperature above the decomposition temperature of the polymer for removing the polymer and form a coating of phosphor particles devoid of polymer on a fluorescent lamp glass.

According to another preferred embodiment, the preferred polymers are polymers which become tacky when heated to a polymer softening temperature and are non-tacky below a polymer softening temperature.

The pretreatment of the phosphor particles comprises depositing a polymer on the surface of the phosphor and, optionally, the interior surface of the glass. The deposition of polymer on the phosphor particles enhances the electrostatic coating process by improving the flowability of the phosphor, increasing the adhesion of the coating, raising the upper bound of the coating weight and improving the cosmetics of the coated lamp. In accordance with additional embodiments of the present invention, the phosphor and, optionally, the glass are pretreated prior to electrostatically coating the phosphor on the glass.

In an even more preferred embodiment, the process includes one or more of the following steps: (a) depositing polymer on the phosphor and, optionally, the inner surface of the glass; (b) transporting the polymer treated phosphor in a carrier gas stream to an electrostatic probe; (c) charging the polymer treated phosphor as it travels through the corona developed at the probe which is maintained at a negative potential; (d) maintaining the glass substrate at an appropriate first temperature, such as by using an electrically heated mold, while the phosphor particles coat the inner surface; preferably the mold is preheated for this step but is electrically isolated during the period the glass is being electrostatically coated (f) exposing the phosphor coating on the glass to steam to dissipate residual charge from the coated lass; and (g) heating the coated glass to remove the polymer and any water vapor.

DETAILED DESCRIPTION

Figure 1:
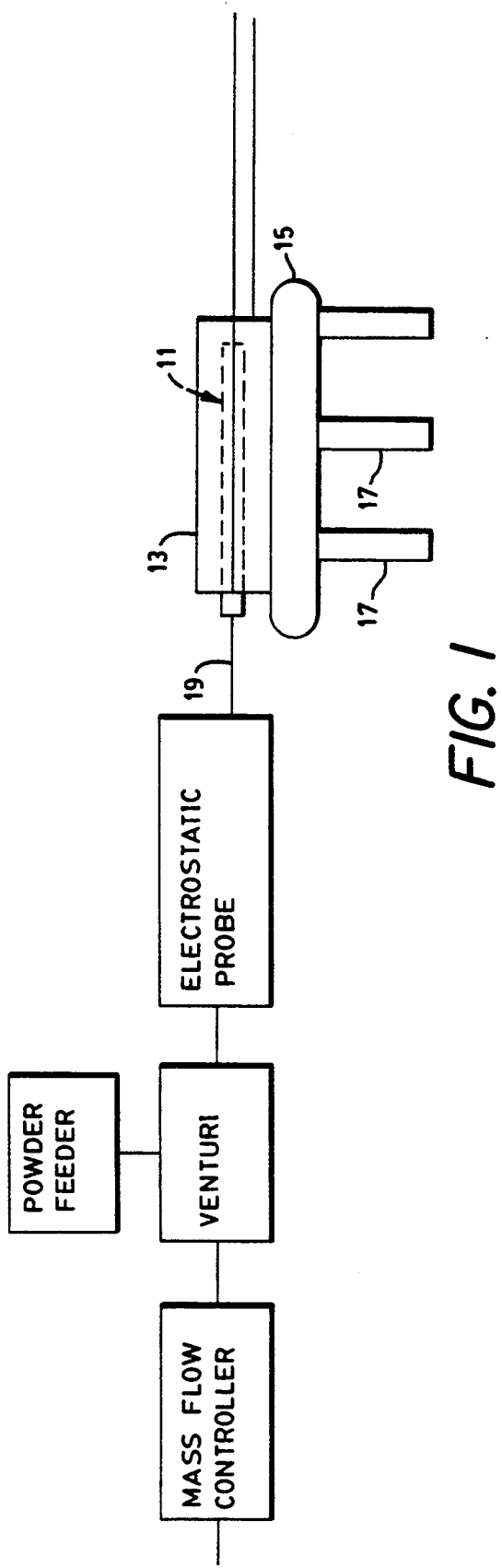
FIG. 1 is a schematic diagram of the coating apparatus utilized in the process of the present invention.

Phosphor particles are pretreated by depositing a polymer on the surface of the phosphor and, optionally, the interior surface of the glass. The deposition of polymer to the phosphor particles enhances the electrostatic coating process by improving the flowability of the coating, increasing the adhesion of the coating, raising the upper bound of the coating weight and improving the cosmetics of the coated lamp.

The polymer is a type having a decomposition temperature and which is transformable from a non-adhering state to an adhering state. Inorganic additives are often present in polymers. In the present case, such additives should not adversely affect lamp performance. For example, it is known that silica reacts adversely with mercury in low pressure discharge lamps. Preferably, the concentration of silicates in the coating of the finished lamp should not exceed 500 parts per million.

The preferred polymers are polymers which become tacky when heated to a polymer softening temperature and are in a non-tacky state below a polymer softening temperature. Preferred polymers are soluble in an aqueous or organic solvent. A coating of the polymer may be applied to the particles by contacting a mixture of the fluid containing the polymer with the particles. Typical polymers are thermoplastic polymers which soften when exposed to heat and return to their original condition when cooled. Typical synthetic thermoplastic polymers include polyvinyl chloride, nylons, fluorocarbons, linear polyethylene, polyurethane prepolymer, polystyrene, and cellulosic and acrylic resins.

The preferred polymer has a melting point in the range of 60°-110° C. so that a low coating temperature is maintained during the deposition of the phosphor. Preferably the polymer decomposes and burns out in air by about 475° C. This is an upper bound of temperature. A higher temperature may lead to deformation of the lime glass during bakeout.

Hydrophilicity or hydrophobicity of the polymer determine the process by which the polymer is deposited on the phosphor particle surface and, optionally, the glass surface. Water insoluble polymers require an organic solvent. A typical water insoluble polymer is poly vinyl chloride.

A water soluble polymer is preferable to develop an environmentally attractive aqueous process rather than an organic process. Typical water soluble polymers include polyacrylic acid, polymethacrylic acid, polyacrylamide, polymethacrylamide, poly-N-alkylacrylamide, polyvinylpyrrolidone, polyvinylpyridine and derivatives, polyethylene imine, poly-(ethylene oxide), and low molecular weight polypropylene oxide. A preferred polymer is a poly-(ethylene oxide) polymer having a low melting point of about 62°-67° C. An example of this polymer is Polyox manufactured by Union Carbide. The average molecular weight of the grade of Polyox used in this study is about 400,000. A lower MW Polyox, up to a lower limit of MW of about 100,000, could also be used. Thermogravimetric analysis of Polyox indicates burn-out in air by about 425°-450° C.

Next the phosphor particles comprising polymer are entrained in a carrier gas wherein the polymer is in a non-adhering state. The phosphor particles are entrained in the carrier gas in a non-tacky state and transported in the carrier gas stream to an electrostatic probe. The polymer treated phosphor is charged as it travels through the corona developed at the probe. The probe is preferably maintained at a negative potential to impart a sufficient negative charge to the particles to attract the particles to the lamp glass.

Then the phosphor particles comprising polymer are deposited on the fluorescent lamp glass. During this step, the polymer is in an adhering state for retaining the phosphor particles on the fluorescent glass to form a coated fluorescent glass.

During the deposition of the phosphor on the inner surface of the glass, the glass is maintained at an appropriate first temperature, such as by using an electrically heated mold, while the phosphor particles coat the inner surface. Preferably the mold is preheated to assure that the initial deposition of phosphor particles is at the correct temperature.

During the period the glass is being electrostatically coated, the mold preferably remains electrically isolated to reduce the magnitude of the charge flow or current to ground. If the probe current exceeds a certain value, the electrical safety circuit of the probe becomes energized and drops the probe voltage to compensate for the large current. A reduction in the probe voltage is not desirable because it reduces the charge transferred from the probe corona to the phosphor particles comprising polymer. Reduction in the charging of the particles affects the quality of the coating. Any charge build up on the coating, after the phosphor particles comprising polymer are deposited on the glass, is dissapated by grounding through a conductive path. This helps reduce the porosity of the coating by eliminating charge induced repulsion among the particles. Exposing the phosphor coating on the glass to a conductive fluid such as steam to dissipate electrostatic charges is preferred.

Next, the coated fluorescent glass is heated to a temperature above the decomposition temperature of the polymer for removing the polymer to form a coating of the phosphor particles on the fluorescent lamp glass which is devoid of organic compounds. The heating also desirably removes any water vapor which can be deleterious to the operation of a completed fluorescent lamp.

The process is used to produce a fluorescent lamp containing a phosphor excitable to fluorescence. A fluorescent lamp comprises a tubular, hermetically sealed, glass envelope. Electrodes are sealed in the ends of envelope. Suitable terminals are connected to the respective electrodes and project from envelope. The electrodes extend through glass presses in mount stems to the terminals. The interior of the tube is filled with an inert gas such as argon or a mixture of argon and krypton at a low pressure, for example 2 torr, and a small quantity of mercury, at least enough to provide a low vapor pressure during operation. An arc generating and sustaining medium such as one or more inert gases and mercury is included within the envelope so that ultraviolet radiation is produced in the interior of the glass envelope during lamp operation. A phosphor coating on the interior surface of the glass envelope converts the emitted ultraviolet radiation to visible illumination having a white color.

EXAMPLES

In the detailed description which follows, the word "phosphor blend" refers to a two component blend of rare earth phosphors containing 70% by mass of red phosphor, $Y_2O_3$: Eu, the balance being a green phosphor, $(Ce,Tb) Mg Al_{11}O_{19}$: Ce,Tb. The specific surface areas of these two phosphors are about 0.65 and 0.3 $m^2/g$ respectively. A tricomponent blend with red, green and blue phosphors could also be used. The glass being electrostatically coated is a commercial GTE twin tube (TT) U shaped lime glass used for the production of energy efficient compact fluorescent lamps.

PRETREATMENT OF GLASS AND PHOSPHOR

Seven different pre-treatment approaches to the phosphor blend and/or the glass were used for electrostatic coating of the compact fluorescent lamp glass:

(a) 0.5% by mass of finely divided alumina, like Aluminum Oxide C from Degussa, was dry blended with the phosphor blend.

(b) 5% by mass of finely divided alumina, like Aluminum Oxide C from Degussa, was dry blended with the phosphor blend.

(c) 0.5% by mass of finely divided polymer powder was dry blended with the phosphor blend.

(d) 0.5% by mass of finely divided alumina, like Aluminum Oxide C from Degussa, was dry blended with the phosphor blend and a polymer film was deposited on the inner surface of the glass using 2.5% polymer solution.

(e) 0.5% by mass of finely divided alumina, like Aluminum Oxide C from Degussa, was dry blended with the phosphor blend and a polymer film was deposited on the inner surface of the glass using 5% polymer solution.

(f) polymer was deposited on the surface of the phosphor blend using 2.5% polymer solution and a surfactant.

(g) polymer was deposited on the surface of the phosphor blend using 2.5% polymer solution.

Pretreatment methods (a) and (b) are self-explanatory. The polymer chosen for the subsequent tests was Polyox which is poly-(ethylene oxide): a low melting point (62°–67° C.), hydrophilic and water soluble polymer manufactured by Union Carbide. The average molecular weight of the grade of Polyox used in this study is about 400,000. A lower MW Polyox, up to a lower limit of MW of about 100,000, could also be used. In addition, any other polymer (i.e. non Polyox) which has a melting point in the range of 60°–110° C. is acceptable. While the polymer Polyox is hydrophilic and water soluble, alternate polymers need not necessarily have these properties. Hydrophilicity or hydrophobicity govern only the process by which the polymer is deposited on the phosphor blend surface and, optionally, the glass surface. A water soluble polymer is preferable in that it is possible, like in this invention, to develop an environmentally attractive aqueous process rather than an organic process to deposit the polymer on the phosphor. Preferably the polymer selected burns out in air by about 475° C. This is an upper bound of temperature. A higher temperature will lead to deformation of the lime glass during bakeout. Thermogravimetric analysis of Polyox indicates burn-out in air by about 425°–450° C.

In method (c) a very fine size Polyox is used as an additive to the phosphor blend. The fine polymer is made by classifying commercial size Polyox. The specific surface areas of the two materials give a good indication of their relative particle sizes. The BET Monosorb areas for the classified and standard polymers are 2.99 $m^2/g$ and 1.68 $m^2/g$ respectively, clearly proving the smaller particle size of the classified polymer.

POLYMER TREATMENT OF GLASS

The standard Polyox polymer, MW of 400,000, was dissolved in water to make an aqueous solution which contained 2.5% by mass of polymer. This is referred to in the specification as a 2.5% Polyox solution. Twenty TT glasses were tared, filled with the 2.5% Polyox solution, inverted and allowed to dry in a convection oven at 110° C. for 4 hours and then weighed again. The mean coating weight of the polymer on the glass was 2.46 mg. When the process was repeated with 5% Polyox solution, the mean coating weight of the polymer was 19.9 mg. The range of polymer loading can be obtained by taking the ratio of the mass of polymer to the internal surface area of the glass which is about 100 cm$^2$. The polymer loading is found to be 0.02 to 0.2mg/cm$^2$ of glass surface. The highly nonlinear nature of the mass of the polymer coating is attributed to the nonlinear dependence of solution viscosity on the concentration of the polymer which influences the relative values of the polymer solution drain time and the film setting up time due to drying. The drying time of 4 h is sufficient, as shown by an additional drying period of 4 hours at 110° C. for the 5% Polyox system which did not reveal any change in the weight of the polymer coated tubes. Reflectance IR spectroscopy was used to verify the presence of polymer on the inner surface of the twin tube glass. Absorption in the 3000 cm$^{-1}$ region of the spectrum indicates the presence of the polymer.

POLYMER TREATMENT OF PHOSPHOR

A mass of 2 kg of the phosphor blend was added to 1 liter of 2.5 % Polyox solution. The only difference between methods (f) and (g) is that in (f) 3 cc of a block Polyol, non-ionic surfactant ( Macol 32 from PPG Industries) was added to the Polyox solution. The mixture was stirred for 30 minutes and then rolled for 20 minutes to ensure wetting. The dispersion was then poured into a Buchner funnel with #41 filter paper and vacuum filtered for about 4.5 hours until no more filtrate droplets were observed. The filter cake was subsequently dried in a convection oven for 48 hours at 110° C. The oven setting was then raised to 120° C. and a solids sample taken after 24 hours. Next, the oven temperature was increased to 130° C and the solids sampled after 24 h . Finally, the set point was changed to 140° C. and a solids sample gathered after 24 hours.

Each of the powder samples was subjected to two studies: flowability and weight loss at an elevated temperature. In the flowability tests, the loosely packed bulk density (LPBD) and the tapped density (TD) were measured using a Hosokawa Powder Tester. The Hausner Ratio (HR) was then computed. The HR, which always exceeds unity, is the ratio of the TD to the LPBD and is a measure of the cohesiveness, hence the flowability, of a powder. The higher is the HR, the more cohesive or less free flowing is the powder. In the weight loss tests, each solids sample was heat treated for 1 h at 550° C. and the change in mass measured with respect to the dried solids.

TABLE 1

| FLOWABILITY AND WEIGHT LOSS | | | | |
| --- | --- | --- | --- | --- |
| MATERIAL | LPBD | TD | HR | % WT LOSS at 550° C. |
| AS RECEIVED PHOSPHOR | 0.9298 | 1.7807 | 1.915 | 0.14 |
| AS RECEIVED PHOSPHOR, DRIED AT 140 C. | 0.9735 | 1.8065 | 1.856 | 0.11 |
| POLYMER TREATED, DRIED AT 110 C. | 0.9992 | 1.8331 | 1.835 | 0.51 |
| POLYMER TREATED, DRIED AT 120 C. | 1.0338 | 1.8360 | 1.776 | 0.47 |
| POLYMER TREATED, DRIED AT 130 C. | 1.0332 | 1.8430 | 1.784 | 0.46 |
| POLYMER TREATED, DRIED AT 140 C. | 1.0633 | 1.8780 | 1.766 | 0.43 |

Column 4 of Table 1 shows the HR of the as received phosphor blend, the as received phosphor blend after drying at 140° C. and the polymer treated phosphor blend. The polymer treated phosphor blend which is dried at 140° C. has the lowest HR of the four polymer treated samples and also the lowest HR of any of the six materials. It can be expected, therefore, that of all the materials, the polymer treated material dried at 140° C. would handle best in the powder feeder system which delivers powder to the electrostatic coating unit. Experiments do support this expectation. It is concluded, therefore, that polymer treatment of the phosphor blend, followed by drying at 140° C. improves the flowability of the material. Other polymers may also be used to achieve this effect. This invention, therefore, does not necessarily restrict itself to the particular polymer used in this study. The polymer treated phosphor blend dried at 140° C. was used in steps (f) and (g)

Column 5 of Table 1 shows the % loss in mass observed upon heat treatment of the materials listed in Column 1. This information will now be used to compute the amount of polymer that is deposited on the surface of the phosphor which is polymer treated and then dried at 140° C. Drying of the as received phosphor at 140° C. for 16 h leads to a loss in mass of 0.14 g based on 411.78 g of the starting material or a % loss of 0.0334. This indicates that the amount of loosely bound moisture in the as received phosphor is small. Drying of the polymer coating at 140° C. removes substantially all of the moisture from the polymer film and the loosely bound moisture from the as received phosphor, but retains the strongly bound moisture and other thermally degradable impurities associated with the as received phosphor. The loss in mass on heating at 550° C. reflects, therefore, the mass of polymer deposited on the phosphor + the mass of strongly bound moisture + the mass of the thermally degradable impurities present in the as received phosphor. The loss in mass experienced by the as received phosphor reflects the loosely and strongly bound moisture as well as the other impurities present in that material. The loss in mass of the dried phosphor is attributed to the strongly bound moisture and the thermally degradable impurities.

Let, $M_p$ = mass of polymer deposited on the phosphor
$M_a$ = mass of as received phosphor
$M_l$ = mass of loosely bound moisture in as received phosphor $M_s$ = mass of strongly bound moisture in as received phosphor $M_i$ = mass of impurities present in as received phosphor A = fractional loss in mass on heating at 550° C. of the polymer treated and dried phosphor B = fractional loss in mass on heating at 550° C. of the as received phosphor C = fractional loss in mass on heating at 550° C. of the dried phosphor D = fractional loss in mass on drying at 140° C. of the as received phosphor, It follows from the above that:

$$(M_p + M_s + M_i)/(M_a - M_l + M_p) = A \quad (1)$$

$$(M_l + M_s + M_i)/(M_a) = B \quad (2)$$

$$(M_s + M_i)/(M_a - M_l) = C \quad (3)$$

$$M_l/M_a = D \quad (4)$$

It is desired to calculate $M_p/M_a$ or the mass of polymer deposited per unit mass of the as received phosphor. The system of equations allows simplification by lumping $(M_s + M_i)$ into one unknown. This unknown will be called $M_b$. It follows that:

$$(M_p + M_b)/(M_a - M_l + M_p) = A \quad (1a)$$

$$(M_l + M_b)/M_a = B \quad (2a)$$

$$(M_b)/(M_a - M_l) = C \quad (3a)$$

$$M_l/M_a = D \quad (4)$$

Dividing the numerator and denominator of the LHS Equations (1a) through (3a) by $M_a$, representing $M_p/M_a$ as x and $M_b/M_a$ as y one obtains:

$$(x+y)/(1-D+x) = A \quad (1ai)$$

$$D+y = B \quad (2ai)$$

$$y/(1-D) = C \quad (3ai)$$

Substituting for y from Eqn. (2ai) in Eqn (1ai) one gets:

$$x = [A(1-D) - (B-D)]/[1-A] \quad (5)$$

From Table 1, A = 0.0043, B = 0.0014 and D = 0.000334. It follows from Equation (5) that x = 0.00324. Therefore, the mass of polymer deposited is 0.324% by mass of the as received phosphor. It is noted that Eqn. (3ai) is not used to compute x, but provides a check on the value of x in that the value of y computed from Eqn. (2ai) and used to calculate x from Eqn. (1ai) may be substituted in the LHS of Eqn. (3ai) to see how well the LHS agrees with the RHS or C. It turns out that the LHS of Eqn. (3ai) is 0.001066 and C from Table 1 is 0.0011. This agreement is well within experimental error.

It has been stated previously that 2 kg of phosphor blend is added to 1 l of 2.5 % Polyox solution to deposit the polymer on the phosphor surface. The mass of 1 l of polymer solution is 1.001 kg. This translates to a concentration of about 1.997 g phosphor blend per g of the solution. For a 2.5 % Polyox solution, there is 0.025 g of the polymer in 1 g of the solution. This amounts to 79.88 g of phosphor blend per g of the polymer present in the system. For a 5% Polyox solution, the ratio would be half this amount. It follows from this analysis that the absolute maximum concentration of polymer available to the phosphor in the 2.5 % Polyox solution is 0.0125 g /g of phosphor blend or 1.25% by mass of the phosphor blend. In the previous paragraph x has been shown to be 0.324% or about a quarter of 1.25%. It is concluded that about 25% of the polymer present originally in the solution gets transferred to the phosphor surface.

TABLE 2

POLYMER LOADINGS ON TREATED PHOSPHORS

| SAMPLE | C/Y PEAK AREA RATIO |
|---|---|
| UNTREATED PHOSPHOR | 0.17 |
| POLYMER TREATED PHOSPHOR, DRIED AT 140° C. | 0.22 |

Table 2 shows the results of XPS (X-ray photoelectron spectroscopy) conducted on the surface of the untreated and polymer treated phosphor. The source of the Y peak is the red phosphor which is the major component of the blend. The result of the polymer treatment should be to increase the amount of surface C relative to Y. This is clearly borne out in Table 2.

The phosphor blend which was polymer treated in the presence of the surfactant differs from that which was prepared without surfactant. SEM study shows that the material made with the surfactant appears to be more agglomerated than the one without. In addition, the SEM sample handling procedure indicates that the surfactant prepared material tends to charge more than the other. XPS shows that use of the surfactant leads to a much higher C/Y ratio in the final dried product as compared to that without: 0.42 versus 0.22. This large increase cannot be accounted for by the very small increase in organics content of the system due to the addition of the surfactant. It indicates better wetting, in the presence of the surfactant, of the phosphor blend surface by the polymer solution.

ELECTROSTATIC COATING APPARATUS AND METHOD

The powders treated according to methods (a) through (g) outlined previously were electrostatically coated onto the surface of TT glass of ID 0.386"±0.011" using a coating apparatus shown in FIG. 1. The twin tube glass 11 was held in a block 13 during the coating process. Gray cast iron was used as the material of construction of the block 13, the top cover of which was guided on to the lower piece by two pins. Each section of the block 13 was capable of being heated by four 135 W resistive elements The horizontal motion of the block 13, on rails 15 made of cold rolled steel was controlled by a stepper motor. The area of contact between the lower portion of the block 13 and the rails or slide 15 was minimized to reduce the rate of heat transfer to the latter. The slide 15 was supported by three vertically oriented cylindrical pieces 17 of Ryton IPC-171E: a poly(phenylene sulfide) resin impregnated with glass. The choice of Ryton was made on the basis of its coefficient of thermal expansion, dielectric strength, resistivity and high temperature durability. The coating station was enclosed, for safety reasons, by a Faraday cage which minimized the concentration of free ions outside of this environment.

Figure 2:
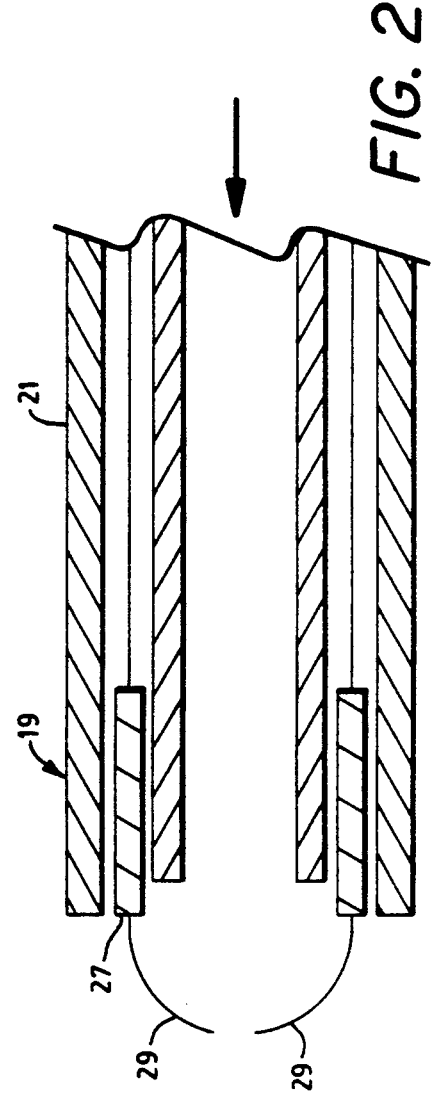
FIG. 2 is a cross sectional view of a portion of an electrostatic coating probe.

A quantity of the pretreated phosphor blend was introduced into the hopper of a powder feeder which delivered the material to the suction zone of a venturi supplied with dry motive air. The downstream of the venturi leads to a teflon tube of ID≈0.085" and OD=0.125". The teflon tube enters an electrostatic probe 19 shown in FIG. 2. A polycrystalline alumina tube 21 of OD=0.25" forms the outer jacket of this probe 19. In between the alumina tube 21 and the inner teflon tubing 23 is a wire 25 which delivers a maximum of 100 kV to a brass insert 27 snug fit at the end of the probe 19, between the teflon 23 and alumina 21 tubes. Attached symetrically to the outer end of the brass insert 27 are four curved tungsten wires 29 ending in needle points. It is at these points that a corona develops. As the phosphor blend in the carrier gas stream emerges from the probe, the particles get charged during their passage through the corona.

The following steps were followed to electrostatically coat twin tube glass:

1. The block was homed to a position such that the end of the coating probe was just outside of the end of one of the legs of the twin tube.
2. The glass was placed on the lower cast iron block of the coating station and the cover closed. The block heaters were switched on and the heating continued till the block temperature was 220° C.±10° C. At this point, the electrical connection to the heaters was disconnected, thereby creating an electrically floating block.
3. The powder feeder was started, the electrical power to the coating probe was switched on and the block rapidly moved in so that the coating probe was now inside the glass and about 0.75" from the start of the bend area of the twin tube.
4. The block was then moved out at an appropriate speed controlled by the stepper motor, thereby causing a relative motion between the coating probe and the glass. Electrostatic coating of the glass was realized during this step as the probe gradually withdrew from the inside of the glass. A typical coating time is about 6 to 10 s.
5. When the probe had exited completely, the twin tube was turned to align the second leg with the coating probe and the previous steps repeated to electrostatically coat the second leg.
6. The electrostatically coated twin tube was then steamed for 3s.
7. The steamed twin tube was finally baked at 450° C. for 5 min with 4 scfh of oxygen.

The electrostatically coated twin tubes were evaluated with respect to three criteria: powder weight, blow test loss and visual appearance. A concern with electrostatic coating is that back ionization may limit the mass of coating that may be deposited electrostatically. The concern stems from the fact that if the powder weight is too low, the lamp brightness will suffer. If a particular pretreatment process is capable, however, of depositing a larger than required mass of powder, then the process can always be tailored to deposit a smaller and optimum quantity of the phosphor. The lamp performance will, however, suffer if the maximum powder that a certain pretreatment will deposit is on the low side. The blow test loss quantifies the coating strength both in terms of cohesion among particles and adhesion of the coating to the glass. The smaller the blow test loss, the better is the coating strength Finally, a visual check is necessary to identify flaws in the coating like pin holes, larger fall-off areas and light coating areas.

Column 2 of Tables 3 to 9 list the powder weight of the twin tubes coated using the various pretreatment methods listed earlier. It is observed that treatment (g), Table 9, which uses polymer treated phosphor blend is able to deposit the highest powder weight on the glass. In addition, this pretreatment is capable of at least 30% higher powder weight than its closest competitor.

A blow test method was developed to quantify the coating strength both in terms of cohesion among particles and adhesion of the coating to the glass. Nitrogen gas was introduced into the coated tube through a ⅛ NPT iron pipe which just fits the twin tube diameter. The gas flow was controlled using a 600 slm (full scale) electronic mass flow controller. The set point was 8% of full scale or 48 slm. The gas flow was maintained for 5 s inside the coated tube. The % loss in mass of the coating after the flow of gas quantifies the coating strength. Column 3 of Tables 3 to 9 list the blow test loss in mass. It is clear that treatment (g), Table 9, which uses polymer treated phosphor blend deposits a coating with the best coating strength. Expressed as a % of the mean powder weight, the blow test loss for the polymer treated phosphor is 5.8 which is at least 0.7 times lower than its nearest competitor.

A visual check was given to the electrostatically coated lamps to identify flaws in the coating like pin holes, larger fall-off areas and light coating areas. The results are summarized in Column 4 of Tables 3 to 9. It is clear that the twin tubes coated with polymer treated phosphor blend, pretreatment method (g) and Table 9, have by far the best visual appearance.

It is concluded based on the above evaluations that pretreatment of the phosphor blend with polymer results in the best electrostatic coating in terms of coating weight, adherence and cosmetics. The use of polymer treated glass in conjunction with polymer treated phosphor is also included in the scope of this invention. While the authors do not wish to be bound by particular statements about the mechansim/s by which the polymer works, it may be hypothesized that the polymer treatment increases the electrostatic charge bearing capacity of the phosphor. In addition, this treatment definitely increases the flowability of the phosphor as discussed earlier in this specification.

TABLE 3

| | 0.5% AOC DRY BLENDED WITH PHOSPHOR | | |
|---|---|---|---|
| GLASS ID | COATING WT | BLOW TEST LOSS | COSMETICS |
| P-26 | 0.55 | 0.07 | 10% OF END, 2 HOLES ⅛" ONE LEG |
| P-27 | 0.59 | 0.09 | 10% OF END, ¼" HOLE ONE LEG |
| P-28 | 0.65 | 0.12 | 20% OF END, LIGHT LAST ⅛" ONE LEG |
| P-29 | 1.03 | 0.07 | NO VISIBLE LOSS |
| P-30 | 0.89 | 0.07 | 1/16" HOLE IN END |
| P-31 | 0.80 | 0.07 | NO VISIBLE LOSS |
| P-32 | 0.81 | 0.05 | NO VISIBLE LOSS |
| P-33 | 1.00 | 0.07 | NO VISIBLE LOSS |
| MEAN ± SD | 0.79 ± 0.18 | 0.077 ± 0.021 | |

TABLE 4

5% AOC BLENDED WITH PHOSPHOR

| GLASS ID | COATING WT | BLOW TEST LOSS | COSMETICS |
|---|---|---|---|
| P-34 | 0.43 | 0.05 | 15% OF END, SOME SPOTS ON LEG |
| P-35 | 0.38 | 0.02 | NO VISIBLE LOSS |
| P-36 | 0.45 | 0.02 | NO VISIBLE LOSS |
| P-37 | 0.46 | 0.04 | 10% OF END, PIN HOLES IN LEG |
| P-38 | 0.48 | 0.02 | NO VISIBLE LOSS |
| P-39 | 0.51 | 0.15 | 90% OF END, PIN HOLES IN LEG |
| P-40 | 0.61 | 0.01 | LIGHT AREA ⅜ OF LEG |
| P-41 | 0.47 | 0.01 | 15% OF END, SOME SPOTS ON LEG |
| MEAN | 0.474 ± 0.067 | 0.04 ± 0.046 | |

TABLE 5

0.5% FINE SIZE POLYOX DRY BLENDED WITH PHOSPHOR

| GLASS ID | COATING WT | BLOW TEST LOSS | COSMETICS |
|---|---|---|---|
| P-1 | 0.21 | 0.06 | END 10% CLEAR, 1 LEG CLEAR 1" |
| P-2 | 0.65 | 0.06 | 2 LIGHT AREAS IN BEND |
| P-3 | 0.59 | 0.10 | OUTSIDE BEND CORNERS CLEAN |
| P-4 | 0.56 | 0.11 | 1 END CORNER, BOTH SIDE 1" SPOTS |
| P-5 | 0.55 | 0.09 | END 10% CLEAR, SIDE 1" CLEAR |
| P-6 | 0.64 | 0.07 | 2 SMALL CLEAR SPOTS ON LIGHT ¼" END |
| P-7 | 0.64 | 0.13 | END 15% CLEAR, 1 LEG CLEAR ¼" |
| P-8 | 0.58 | 0.09 | END INSIDE BEND CLEAR, 1 LEG ¾" CLEAR, CLEAR SPOTS ALL OVER |
| MEAN | 0.553 ± 0.144 | 0.089 ± 0.025 | |

TABLE 6

0.5% AOC BLENDED, GLASS PRETREATED WITH 2.5% POLYOX SOLUTION

| GLASS ID | COATING WT | BLOW TEST LOSS | COSMETICS |
|---|---|---|---|
| P-18 | 0.71 | 0.06 | 1 SMALL ⅛" DIA HOLE ON END |
| P-19 | 0.64 | 0.13 | 30% OF END |
| P-20 | 0.84 | 0.08 | 2 SMALL 1/16" HOLES ON END |
| P-21 | 0.82 | 0.07 | NO VISIBLE LOSS |
| P-22 | 0.85 | 0.06 | NO VISIBLE LOSS |
| P-23 | 0.81 | 0.07 | NO VISIBLE LOSS |
| P-24 | 0.76 | 0.04 | NO END LOSS |
| P-25 | 0.30 | 0.06 | 20% OF END 10% OF LEGS |
| MEAN | 0.716 ± 0.183 | 0.071 ± 0.026 | |

TABLE 7

0.5% AOC BLENDED, GLASS PRETREATED WITH 5% POLYOX SOLUTION

| GLASS ID | COATING WT | BLOW TEST LOSS | COSMETICS |
|---|---|---|---|
| P-9 | 0.51 | 0.18 | ⅛ END, AREA ⅜ OF EACH LEG |
| P-10 | 0.42 | 0.25 | ¾ END AREA ½ OF LEGS |
| P-11 | 0.43 | 0.29 | ENTIRE END, ⅛ OF LEGS |
| P-12 | 0.52 | 0.22 | 70% OF END, ⅛ OF 1 LEG, SPLOTCHY AFTER LEG |
| P-13 | 0.45 | 0.26 | ENTIRE END, ⅛ OF 1 LEG, LIGHT 2ND LEG |
| P-14 | 0.50 | 0.25 | ⅜ OF END, ⅛ LEGS |
| P-15 | 0.39 | 0.15 | ⅜ OF END, ⅛ LEGS |
| P-16 | 0.42 | 0.22 | 80% OF END, ⅛ LEGS |
| P-17 | 0.46 | 0.37 | ENTIRE END, ⅛ LEGS |
| MEAN | 0.456 ± 0.046 | 0.243 ± 0.064 | |

TABLE 8

PHOSPHOR COATED WITH POLYOX (SURFACTANT USED)

| GLASS ID | COATING WT | BLOW TEST LOSS | COSMETICS |
|---|---|---|---|
| P-47 | 0.86 | 0.08 | HALF OF ONE LEG |
| P-48 | 0.68 | 0.08 | 10% OF END |
| P-49 | 0.79 | 0.24 | 20% OF END, QTR OF ONE LEG |
| P-50 | 0.69 | 0.15 | 15% OF END, HOLES IN ONE LEG |
| P-51 | 0.77 | 0.18 | 20% OF END, HOLES IN ONE LEG |
| P-52 | 0.74 | 0.22 | 50% OF END, HOLES IN ONE LEG |
| MEAN ± SD | 0.755 ± 0.067 | 0.158 ± 0.068 | |

TABLE 9

PHOSPHOR COATED WITH POLYOX (NO SURFACTANT)

| GLASS ID | COATING WT | BLOW TEST LOSS | COSMETICS |
|---|---|---|---|
| P-42 | 0.81 | 0.05 | NO VISIBLE LOSS |
| P-43 | 0.95 | 0.07 | NO VISIBLE LOSS |
| P-44 | 1.07 | 0.05 | NO VISIBLE LOSS |
| P-45 | 1.04 | 0.09 | NO VISIBLE LOSS |
| P-46 | 1.24 | 0.04 | NO VISIBLE LOSS |
| MEAN ± SD | 1.022 ± 0.158 | 0.06 ± 0.02 | |

We claim:

1. A method for forming a coating of phosphor particles on a fluorescent lamp glass comprising entraining polymer treated phosphor particles in a carrier gas, said polymer having a decomposition temperature and a polymer softening temperature, heating the fluorescent lamp glass to a temperature above the polymer softening temperature for adhering the polymer to the fluorescent lamp glass, depositing the polymer treated phosphor particles on the fluorescent lamp glass and forming a coated fluorescent lamp glass, heating the coated fluorescent lamp glass to a temperature above the decomposition temperature of the polymer for removing the polymer and forming a coating of phosphor particles on a fluorescent lamp glass.

2. The method in claim 1 wherein said phosphor particles are deposited on the fluorescent glass by applying a sufficient electric charge to the phosphor particles for attracting the polymer treated phosphor particles to the fluorescent lamp glass.

3. The method in claim 1 wherein said polymer becomes tacky when heated, and said polymer treated phosphor particles are entrained in the carrier gas in a non-tacky state and deposited on said fluorescent lamp glass in a tacky state.

4. The method in claim 3 wherein said polymer treated phosphor particles are rendered tacky by heating said polymer to the tacky state to retain said phosphor particles on said fluorescent glass and form said coated fluorescent glass.

5. The method in claim 1 wherein a polymer is deposited on said fluorescent lamp glass prior to applying the phosphor particles.

6. The method in claim 5 wherein the range of polymer loading on the glass is from 0.02 to 0.2mg/cm$^2$.

7. The method in claim 1 wherein said polymers are thermo-plastic polymers which become tacky when heated to a polymer softening temperature and are in a non-tacky state below a polymer softening temperature.

8. The method in claim 1 wherein said polymer treated phosphors in a non-tacky state are negatively charged by passing through a corona developed by an electrostatic probe which is maintained at a negative potential.

9. The method in claim 1 wherein said fluorescent glass is maintained at a temperature above said softening temperature by using an electrically heated mold in contact with said glass while the phosphor particles coat said fluorescent glass.

10. The method in claim 9 wherein said mold is preheated for and electrically isolated during the said deposition of said polymer treated phosphor particles.

11. The method in claim 9 wherein, after said polymer treated phosphor particles are deposited on said fluorescent glass, electrostatic charge in the coating is dissipated by providing a conductive path.

12. The method in claim 11 wherein said polymer treated phosphor particles are exposed to a conductive fluid to dissipate electrostatic charge from the coating, and said fluorescent glass is subsequently heated to remove said polymer and said conductive fluid.

13. The method in claim 1 wherein said phosphor particles comprise a phosphor blend composed of rare earth activated phosphors.

14. The method of claim 13 wherein the rare earth phosphors emit in the red, green and blue regions of the visible spectrum.

15. The method of claim 13 wherein the rare earth phosphors emit in the red and green regions of the visible spectrum.

16. The method in claim 15 wherein the red phosphor is at least 60% of the phosphor blend.

17. The method in claim 15 wherein the red phosphor is $Y_2O_3$: Eu.

18. The method in claim 17 wherein the specific surface area of the $Y_2O_3$: Eu phosphor is 0.65 m$^2$/g or larger.

19. The method in claim 15 wherein the specific surface area of the green phosphor is 0.3 m$^2$/g or larger.

20. The method in claim 1 wherein the polymer has a melting point between 60° and 110° C.

21. The method of claim 20 wherein the polymer has a melting point between 60° and 70° C.

22. The method in claim 1 wherein said final coating comprises less than 500 ppm silicates from additives in said polymer.

23. The method in claim 1 wherein said polymer decomposes at a temperature below about 450° C.

24. The method in claim 1 wherein the amount of polymer deposited on the phosphor is 0.3 to 0.8% of the phosphor.

25. The method in claim 1 wherein fluorescent glass comprises a twin tube glass and the amount of polymer deposited on the twin tube glass is 0.02 to 0.2 mg/cm$^2$ of internal surface of glass.

26. The method in claim 1 wherein said polymer treated phosphor is at least 10% less cohesive than an untreated phosphor.

27. The method in claim 26 wherein said polymer treated phosphor has a Hausner Ratio of 1.76 or lower.

28. The method in claim 1 wherein the use of the polymer treated phosphor allows specific coating weights from 8 mg/cm$^2$ to 12 mg/cm$^2$.

29. The method in claim 1 wherein said phosphor particles are treated with the polymer by (a) adding a mass of 2 kg of the phosphor to 1 l of 2.5 % polymer solution (b) stirring the mixture for 30 minutes and then rolled for 20 minutes to ensure wetting (c) pouring the dispersion into a Buchner funnel with #41 filter paper and vacuum filtering for about 4.5 h until no more filtrate droplets are observed (d) drying the filter cake in a convection oven for 48 h at 140° C.

30. The method in claim 1 wherein said polymer possesses hydrophilicity or hydrophobicity.

31. The method in claim 1 wherein said polymer is soluble in an organic solvent.

32. The method in claim 1 wherein said polymer is water soluble.

33. The method in claim 32 wherein said water soluble polymer is selected from the group consisting of polyacrylic acid, polymethacrylic acid, polyacrylamide, polymethacrylamide, poly-N-alkylacrylamide, polyvinylpyrrolidone, polyvinylpyridine and derivatives, polyethylene imine, poly-(ethylene oxide), and low molecular weight polypropylene oxide or mixtures thereof.

34. The method in claim 32 wherein said water soluble polymer comprises a poly-(ethylene oxide) polymer.

* * * * *